Patented Sept. 26, 1939

2,174,505

UNITED STATES PATENT OFFICE 2,174,505

DERIVATIVES OF MENTHANE

Joseph L. Richmond, Woodstown, N. J., assignor to E. I. du Pont de Nemours & Company, Wilmington, Del., a corporation of Delaware No Drawing. Application June 30, 1938, Serial No. 216,836

19 Claims. (Cl. 260—503)

This invention relates to the preparation of new chemical compounds from menthane. More particularly it relates to the preparation of surface active products and compositions from menthane. In a more limited sense it relates to a process involving reacting menthane with a gaseous mixture of sulfur dioxide and chlorine and hydrolyzing and purifying the final product.

This invention has for an object the preparation of new chemical compounds by simple procedural reaction. A further object is the preparation of new and improved mercerizing assistants. A still further object is the preparation of surface-active agents from menthane involving cheap reactant materials. A still further object is the preparation of surface-active agents from menthane involving simple, economical apparatus. Still other objects will appear hereinafter.

The above and other objects are accomplished by the following invention which comprises reacting menthane with a gaseous mixture of sulfur dioxide and chlorine.

The carrying out of the process may be exemplified by the following procedure. Gaseous sulfur dioxide and chlorine are mixed in such amounts that there is an excess of the former, preferably about two mols of sulfur dioxide to one mol of chlorine and passed into liquid menthane. The reaction zone is preferably well illuminated with natural or artificial light. Catalysts may be used alone or in conjunction with actinic light. The gaseous mixture should be thoroughly distributed throughout the reaction zone or mixture by a suitable device such a porous diaphragm or a gas distributing stirrer. The two gases may be separately led into the vessel and then mixed.

Soon after the introduction of the gases begins, the temperature begins to rise. In a short time the temperature will have risen to about 55–57° C. the temperature depending upon the rate at which the gases are introduced. When the flow of gases is very fast, external cooling of the reaction mixture may be availed of. Vaporized menthane is returned to the reaction vessel by a reflux condenser, and it is desirable to pass the exit gases through a trap maintaining at about −5° C. Any menthane which passes through the reflux condenser is condensed by this trap and can be returned to the reaction mixture.

When a sufficient amount of the gases has been introduced, the reaction is stopped and useful products may be recovered from the reaction mixture or the latter may be used for the preparation of derivatives. After the reaction has been stopped, dry nitrogen, carbon dioxide or sulfur dioxide may be bubbled through the reaction mixture to remove dissolved chlorine, sulfur dioxide and hydrogen chloride.

The invention will be further illustrated but is not intended to be limited by the following examples in which the parts stated are parts by weight:

Example I

A gaseous mixture of 902 parts by weight of sulfur dioxide and 297 parts by weight of chlorine were passed at a uniform rate for four hours through 200 parts by weight of menthane contained in a flask which was illuminated by a 60 watt incandescent light. Heat was evolved during the reaction. The temperature was maintained at 40° C. by means of a water bath. At the end of four hours the menthane had gained 201 parts by weight. The product formed at this stage apparently contained menthane sulfonyl chlorides, chlormenthane sulfonyl chlorides and small amounts of chlormenthane. The reaction product was then added to 500 parts of 30% sodium hydroxide solution. The temperature during neutralization was maintained at 90° to 95° C. About 883 parts of product were obtained. The product was diluted with 237 parts of water. An insoluble oil layer separated and was removed. The aqueous layer was filtered. This solution contained about 25% active ingredient.

The final product was soluble in 52° Tw. caustic soda solution and showed high wetting power.

Example II

A gaseous mixture of 2000 parts by weight of sulfur dioxide and 700 parts by weight of chlorine were passed at a uniform rate for eight hours through 200 parts by weight of menthane contained in a flask which was illuminated by a 60 watt incandescent light. Heat was evolved during the reaction. The temperature was maintained at 40° C. by means of a water bath. At the end of eight hours the menthane had gained 375 parts by weight. The product formed at this stage contained menthane mono and polysulfonyl chlorides, chlormenthane, sulfonyl chlorides and small amounts of other products. The reaction product was then added to 1000 parts of 30% sodium hydroxide solution. The temperature during neutralization was maintained at 90° to 95° C. About 1550 parts of product were obtained. The product was diluted with 1000 parts of water. An insoluble oil layer separated and was removed. The aqueous layer was filtered. This solution contained about 25% active ingredient. The hydrolysis or saponification product predominated in menthane mono sulfonic acid salts, but contained material amounts of chlormenthane sulfonic acid salts, menthane disulfonic acid salts and significant amounts of menthane polysulfonic acids.

The final product was soluble in 52° Tw. caustic soda solution and showed high wetting power.

It is to be understood that the invention is not limited to this one mode of operation. The conditions of the reaction can be varied widely within the scope of the invention. Thus, the proportions of sulfur dioxide and chlorine can be varied from one to one to five to one sulfur dioxide to chlorine. The time of treatment and the amount of gases passed can be varied. Sometimes a rapid flow of gases for a short time may be advantageous while again a slow flow of gases and a long reaction time may be necessary. A temperature anywhere from 0° to 100° C. may be employed. Temperatures of 30° to 80° C. are preferred.

While the apparatus described in the examples was chosen primarily because it was easily adapted for use in the laboratory, it is obvious that other types may be used particularly when it is to be carried out upon a commercial scale. Materials resistant to the corrosive action of the raw materials and the intermediates may be employed. Means for distributing the gases may include porous diaphragms, perforated coils or similar devices which may be used alone or in conjunction with suitable agitators.

Instead of a closed vessel provided with a reflux condenser, one may use a long narrow tube. The tube may be partially filled with menthane and chlorine and sulfur dioxide may be bubbled into the bottom thereof. A countercurrent apparatus in which menthane flowing in one direction through a tube is caused to react with a gaseous chlorine and sulfur dioxide mixture flowing in the opposite direction as disclosed and claimed in Lockwood and Richmond application, Serial No. 216,843, entitled Continuous process, filed upon an even date herewith, may be resorted to. The reaction tubes can be packed with any device suitable for carrying out the reaction of a liquid with a gas, e. g., Raschig rings, broken glass, etc.

Various changes in the reaction conditions can be made. The reaction can be run under the influence of light, either the ordinary light of the room, in bright sunlight, under powerful incandescent or arc lamps, such as a carbon arc, metal or metal salt cored carbon arc, or a vapor lamp such as a mercury or rare gas lamp, or under strong ultraviolet or infrared radiation. Although the effect of pressure on the reaction has not been studied, we believe that the pressure can be varied suitable from atmospheric pressure up to any desired pressure at which chlorine and sulfur dioxide remain gaseous at the reaction temperature. The reaction may also be carried out in the presence of catalysts.

The reaction zone may be maintained at atmospheric pressure or below, but is preferably carried out at atmospheric pressure or any pressure above so long as the chlorine and sulfur dioxide remain gaseous at the reaction temperature.

This invention is not to be limited to the hydrolysis procedure set forth in the examples. For instance, the concentration of caustic soda used for hydrolyzing the reaction product obtained by treating menthane with a gaseous mixture of sulfur dioxide and chlorine may be varied from 5% to 50%. The reaction is somewhat slower with the more dilute caustic soda solutions and almost instantaneous with the more concentrated solutions. Other alkali metal hydroxides such as potassium, caesium, etc., may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, β-naphthyl amine, etc. Thus, the amine salts of chlor-menthane sulfonic acid may be obtained. Also, the strong quaternary ammonium bases such as tetra-methyl-ammonium, hydroxide and tetraethyl-ammonium-hydroxide may be used for the hydrolysis. The resulting products would be the tetra-methyl-ammonium salt or the tetra-ethyl-ammonium salt of chlor-menthane sulfonic acid. The preferred salt for use in mercerizing liquors is, of course, the sodium salt. For use in acid or salt solutions one of the amine or quaternary ammonium salts may be more desirable as possessing greater solubility.

Water miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol, and its ethers and esters, e. g., ethylene glycol, diethyl ether, dimethyl ether, etc.

The final product can be worked up in a number of ways. It can be left as a solution containing insoluble oil or a solution with the insoluble oil removed. The product can be sprayed- or drum-dried and applied as such, or standardized with some innocuous diluent. If a particularly pure product is desired, the drum dried product can be extracted with hot alcohol and the alcoholic extract evaporated to give a pure 100% product free of inorganic salts. Further, unreacted oil can be removed by diluting the saponified solution and separating. The oil can be extracted by means of a water immiscible solvent or it can be removed by steam distillation.

The menthane sulfonyl chlorides obtained by the process described herein are useful for preparing a wide variety of derivatives for which purpose the crude reaction mixture or the purified individual sulfonyl chlorides may be employed. In addition to the hydrolysis and neutralization reactions above described, they may be reacted with alcohols, either alone or in the presence of alkali metals or organic or inorganic bases to yield esters which are useful as plasticizers for cellulose derivatives and resins. Examples of such are the ethyl, butyl and hexadecyl esters.

By reactions of the menthane sulfonyl chlorides with amines, alone or in the presence of aqueous alkalies, amides and substituted amides are obtained, which products are useful as plasticizers, petroleum chemicals, and insecticides. Thus, ammonia, dimethylamine, isobutylamine, aniline, cyclohexylamine, n-dodecylamine, may be used.

Menthane, when solubilized by sulfur dioxide and chloride, gives a product of exceptionally favorable properties as a wetting agent in mercerizing solutions. It is effective in all strengths of caustic soda solutions customarily used in the textile industry. It may be used alone or in conjunction with other agents or assistants such as cresylic acid, methyl hexalone, pinene, lower molecular weight alcohols, or mixtures of the latter such as are obtained as by-products in the catalytic hydrogenation of carbon monoxide. By virtue of increasing the wetting out action of a mercerizing lye, more rapid and complete penetration is obtained which leads to more rapid and uniform mercerization.

The products prepared according to this invention serve as intermediates for the preparation of numerous derivatives such as, for example, menthane sulfonic acids and salts thereof, sulfinic acids, amides, sulfonyl esters, mercaptans, etc. which may be useful as mercerizing assistants, plasticizers for paints, nitro cellulose lacquers, varnishes, Cellophane, etc., corrosion inhibitors, gum solvents for gasoline, extractants for the refining of gasoline, pour point depressants, insecticides, fly spray ingredients, weed killers, soil fumigants, cotton immunization chemicals, anti-shrinking agents for wool, foaming agents, mold inhibitors, lubricants for steel drawing and metal working, crease-proofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing pastes, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, cleansing compositions as household detergent compositions, shampoos, dentifrices, washing of paper mill felts, etc. They may also be used to improve fat liquoring and leather treatment processes as well as for fat splitting agents. They may be useful in improving the preservation of green fodder. They may also be useful in improving the removal of fibrous layers from surfaces and in metal cleaning. They may also be used to improve flotation processes of ores, pigments, coal, etc. They may be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may be useful in storage batteries and dry cells. Other uses for these products or their derivatives are as fungicides, accelerators, delusterants, extreme pressure lubricants, moth proofing agents, antiseptics, fireproofing agents, mildew preventers, penetrating agents, anti-flexing agents, tanning agents, lathering agents, dust collecting agents, antioxidant, color stabilizer in gasoline, etc.

The hydrolysis products or water-soluble salts of the above-described sulfonyl chlorides which have surface active properties may be used in admixture with one another and/or in admixture with soap and/or soap substitutes of the prior art, for the various purposes wherein soap and/or soap substitutes have previously been used or are capable of use. A few representative uses are set forth in C. F. Reed application, Serial No. 216,332, filed upon an even date herewith, and it is to be understood that the products produced according to this invention may be substituted in like amount for the products of each of the examples of that case.

The surface activity of some of the agents may be enhanced by electrolytes or by the addition of other surface-active agents, e. g., alkylated naphthalene sulfonic acids and their water-soluble salts, salts of higher alkyl sulfuric acid esters as described in Bertsch Patents Nos. 1,968,794, to 1,968,797, long chain betaine derivatives both of the C- and N- and open type which are illustrated by Daimler et al. Patent No. 2,082,275, Balle et al. Patent 2,087,565, Platz et al. Patent 2,097,864, and Balle et al. Patent 2,101,524, long chain ammonium, sulfonium and phosphonium compounds, as well as numerous other soap substitutes.

As many apparently widely different embodiments of this invention may be made without departing from the spirit and scope thereof, it is to be understood that I do not limit myself to the specific embodiments thereof except as defined in the appended claims.

I claim:
1. The process which comprises reacting menthane with a gaseous mixture of sulfur dioxide and chlorine.
2. The process which comprises reacting menthane in the liquid phase with a gaseous mixture of sulfur dioxide and chlorine.
3. The process which comprises reacting liquid menthane with a gaseous mixture of sulfur dioxide and chlorine in the presence of actinic light.
4. The process which comprises reacting liquid menthane with a gaseous mixture containing from 1 to 5 mols of sulfur dioxide to 1 mol of chlorine at a temperature of 30 to 80° C. in the presence of actinic light.
5. The process which comprises reacting a menthane hydrocarbon with admixed gaseous sulfur dioxide and chlorine, the sulfur dioxide being in excess.
6. The process which comprises reacting a menthane hydrocarbon with admixed gaseous sulfur dioxide and chlorine in the presence of ultraviolet light.
7. A mixture of menthane sulfonyl chlorides and chlor menthane sulfonyl chlorides.
8. A chloromenthane sulfonyl chloride.
9. Menthane disulfonyl chloride.
10. The process which comprises reacting a liquid menthane hydrocarbon with a gaseous mixture of sulfur dioxide and chlorine and hydrolyzing the product with a base.
11. The process which comprises reacting liquid menthane with a gaseous mixture containing from 1 to 5 mols of sulfur dioxide to 1 mol of chlorine at a temperature of 30 to 80° C. in the presence of actinic light and hydrolyzing and neutralizing the product with an alkali metal base.

12. A basic solution containing the hydrolysis product produced according to claim 10.

13. The products according to the process of claim 11.

14. The products obtained according to the process of claim 10.

15. The products obtained according to the process of claim 4.

16. A menthane sulfonyl chloride.

17. A menthane mono sulfonyl chloride.

18. A menthane poly sulfonyl chloride.

19. A menthane disulfonyl chloride.

JOSEPH L. RICHMOND.